United States Patent
Swanson et al.

(10) Patent No.: US 7,900,084 B2
(45) Date of Patent: Mar. 1, 2011

(54) RELIABLE MEMORY FOR MEMORY CONTROLLER WITH MULTIPLE CHANNELS

(75) Inventors: Robert C. Swanson, Olympia, WA (US); Michael A. Rothman, Sammamish, WA (US); Mallik Bulusu, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 12/004,574

(22) Filed: Dec. 21, 2007

(65) Prior Publication Data

US 2009/0164837 A1 Jun. 25, 2009

(51) Int. Cl.
*G06F 11/00* (2006.01)
(52) U.S. Cl. ....................................................... 714/6
(58) Field of Classification Search ................... 714/2, 714/3, 5–8, 15, 16, 18, 27, 37, 42, 53
See application file for complete search history.

(56) References Cited

U.S. PATENT DOCUMENTS

| | | | |
|---|---|---|---|
| 6,785,785 B2 * | 8/2004 | Piccirillo et al. | 711/157 |
| 6,854,070 B2 * | 2/2005 | Johnson et al. | 714/5 |
| 7,103,746 B1 | 9/2006 | Kulick | 711/173 |
| 7,130,229 B2 | 10/2006 | Dahlen et al. | 365/200 |
| 7,200,770 B2 * | 4/2007 | Hartwell et al. | 714/7 |
| 7,328,315 B2 * | 2/2008 | Hillier et al. | 711/149 |
| 2003/0070113 A1 * | 4/2003 | Ferguson et al. | 714/6 |
| 2004/0003165 A1 * | 1/2004 | Schulz et al. | 711/5 |
| 2005/0160311 A1 * | 7/2005 | Hartwell et al. | 714/7 |
| 2007/0255999 A1 * | 11/2007 | Risse | 714/766 |
| 2008/0052568 A1 * | 2/2008 | Hillier et al. | 714/718 |
| 2008/0065933 A1 * | 3/2008 | Thayer | 714/42 |
| 2009/0006886 A1 * | 1/2009 | O'Connor et al. | 714/5 |
| 2009/0006900 A1 * | 1/2009 | Lastras-Montano et al. | 714/42 |

* cited by examiner

*Primary Examiner*—Nadeem Iqbal
(74) *Attorney, Agent, or Firm*—Trop, Pruner & Hu, P.C.

(57) ABSTRACT

One embodiment of the invention includes a memory RAS mode whereby a multi-channel memory controller utilizes both memory mirroring and memory sparing to form more complete memory redundancy loss protection.

20 Claims, 4 Drawing Sheets

RELIABLE MEMORY FOR MEMORY CONTROLLER WITH MULTIPLE CHANNELS

BACKGROUND

Conventional computer products may include various reliability, availability, and serviceability (RAS) features targeted at limiting the system impact of, for example, soft and hard errors in a memory subsystem. For example, a memory controller may implement an "Error Correcting Code" (ECC) algorithm, where additional bits of data are stored along with each cache-line fragment such that any single bit error or combination of bit errors may be corrected in hardware. In addition, the memory controller may use multiple channels to enable memory mirroring. Mirroring data may concern maintaining two or more copies of data/datum in the main memory store. For example, the controller's first channel may be coupled to a memory or memory unit that stores primary data. The controller's second channel may be coupled to another memory unit that stores redundant data, which is redundant to the primary data. Thus, the second memory unit "mirrors" the primary data included in the first memory unit. Regardless, even memory systems that include techniques such as memory mirroring have shortcomings.

For example, with a three channel memory controller configured for memory mirroring, the first two channels may be used for memory mirroring (i.e., a primary channel for primary data and a mirror channel for redundant data) while the third channel is not utilized. As a result, a scenario may exist where even though the memory is mirrored across the first two channels, data redundancy is still lost. For instance, persistent uncorrectable errors may exist in one of the mirrored memory units or modules. When this "redundancy loss" occurs the memory may no longer have mirroring protection. Consequently, the system may be shutdown if another uncorrectable error occurs. Furthermore, even if the system can re-enable memory mirroring using a memory coupled to the first or second channels, the system may have another redundancy loss due to the same failing memory unit which could lead to a system shutdown.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
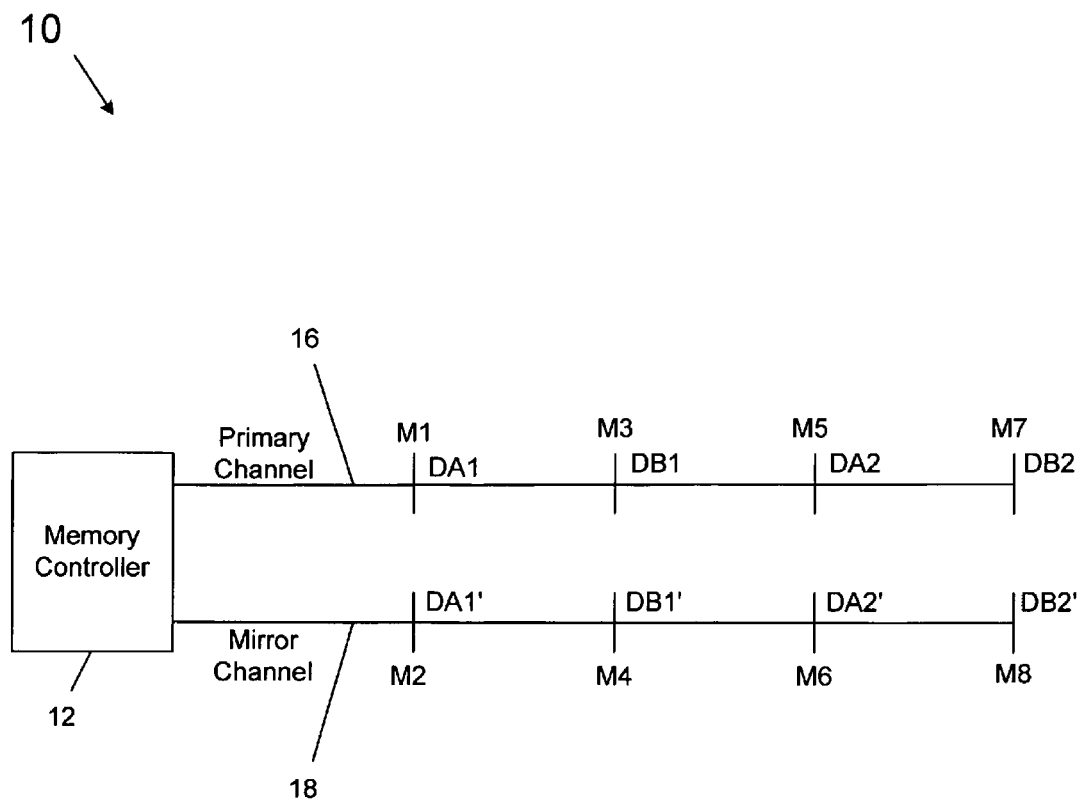
FIG. 1 is a block diagram representation of a prior art memory mirror system.

FIG. 1 is a block diagram representation of a prior art memory mirror system. A system 10 includes a memory controller 12 that is coupled to a primary channel 16 and a mirror or redundant channel 18. Memory modules or units M1, M3, M5 and M7 are coupled to primary channel 16 and memory modules M2, M4, M6, and M8 are coupled to mirror channel 18. Primary data sections DA1, DB1, DA2, and DB2 are provided to memory chips in modules M1, M3, M5, and M7 and redundant data sections DA1', DB1', DA2', and DB2' are provided to memory chips in modules M2, M4, M6, and M8. Primary data sections DA1, DB1, DA2, and DB2 may be identical or essentially identical to redundant data sections DA1', DB1', DA2', and DB2'. For example, DA1' may be identical to DA1. However, these data sections may differ. For example, the bits in the redundant data sections could be the inverse of the corresponding bits in the primary data sections.

Figure 2A:
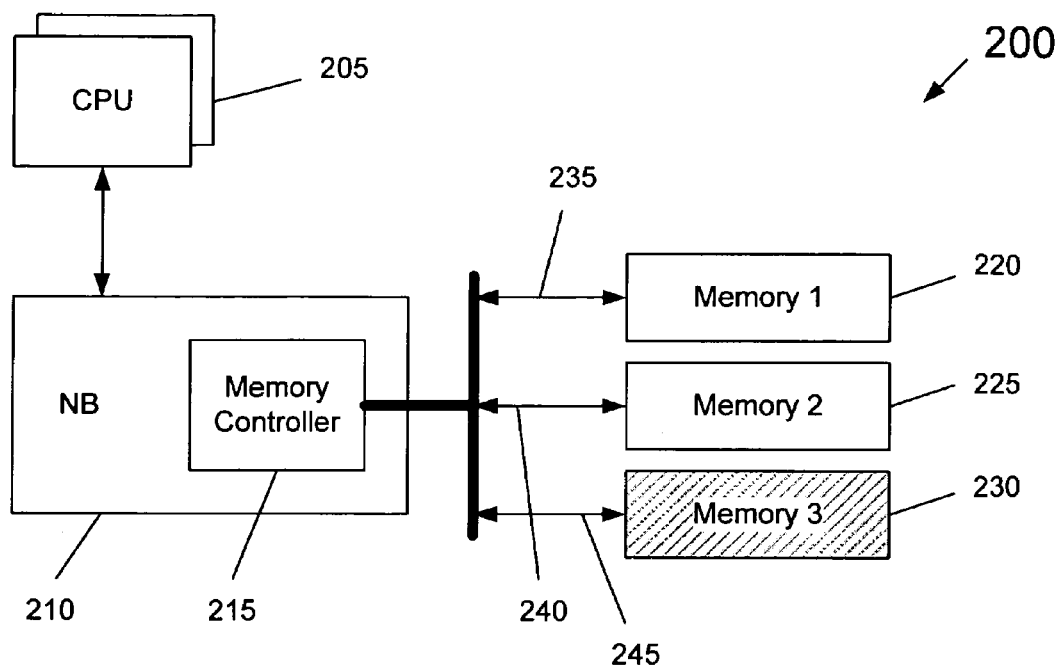
FIGS. 2a and 2b are block diagram representations of one embodiment of the invention.
Figure 2B:
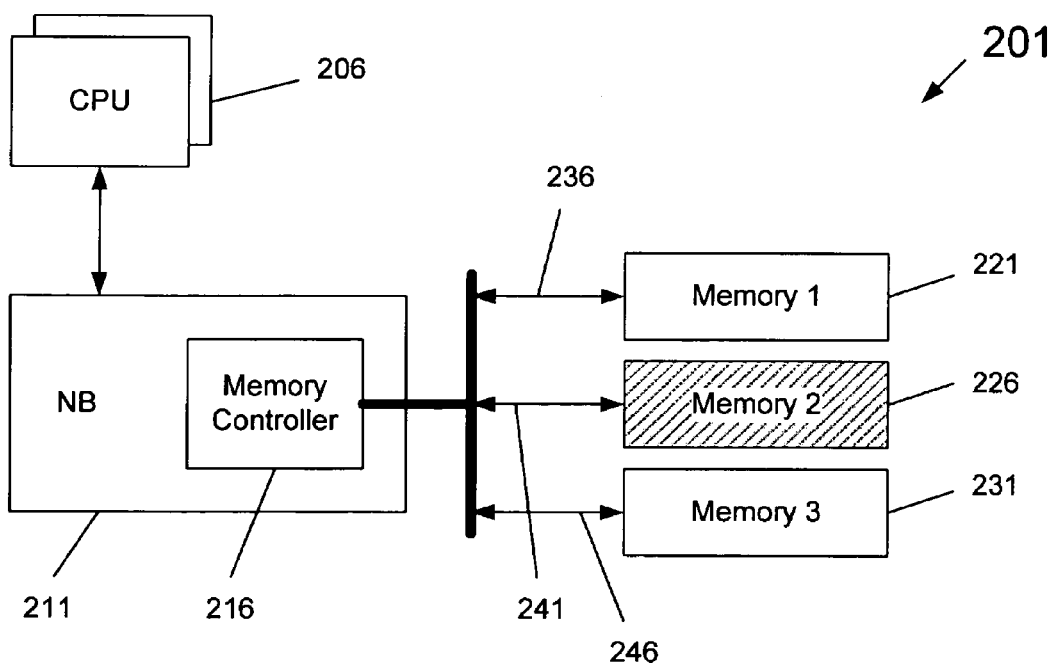

FIGS. 2a and 2b are block diagram representations of one embodiment of the invention. In FIG. 2a, memory controller 215 is coupled to north bridge 210 (i.e., memory controller hub) and central processing unit (CPU) 205. In various embodiments of the invention, the memory controller 215 may be embedded in the CPU 205. Memory controller 215 may have three channels 235, 240, 245. If the system 200 is configured for memory mirroring, the first two channels 235, 240 may be used for memory mirroring while the third channel 245 is not so utilized. In other words, memory may be mirrored across channels 235, 240 with channel 235 being the primary channel coupled to memory unit 220 and channel 240 being the redundant channel coupled to memory unit 225. However, even with this data mirroring orientation in place, data redundancy may still be lost in the event of persistent uncorrectable errors on, for example, a DIMM that includes a memory unit coupled to channel 240.

In contrast, in FIG. 2b one embodiment of the invention may use empty channel 246 as a "spare" in a sparing operation. For example, when memory device 226 is determined to be failing, software may request the removal of the failing memory device 226 from the system memory map. When the memory device 226 is removed from the memory map, the data from the failing memory device 226, or data that mirrors the data in the failing memory device, may be copied to one or more replacement memory devices 231 in a technique called "memory sparing." After the memory data is copied to one or more operational memory devices (e.g., unused memory 231), the address of the failing memory device 236 may, in one embodiment of the invention, be remapped to the new memory device(s) (e.g., memory 231) containing the data.

Memory sparing can be performed without interrupting the normal operation of the memory devices, but may require additional unused (or "spare") memory devices to be available for when a memory device failure is detected. As indicated above, sparing may improve memory reliability by detecting a memory device failure and copying the memory data in the failing memory device (or its mirrored data) into one or more operational memory devices before the failing memory device fails completely. The data-locating address formerly routed to the failing memory device may be rerouted to the new device(s) containing the data when the data transfer is complete, thus making the effects of sparing transparent to the normal operation of retrieving data from the memory. The data now stored in the spare memory may be further copied into other memories in various embodiments of the invention.

Referring to FIG. 2b, in one embodiment of the invention the basic input/output system (BIOS) may attempt to restore memory mirroring between memories 221, 226 when the memory mirror between those memories is lost. If this cannot be done or is not done, the BIOS may force a sparing operation with the spare memory 231 and associated channel 246. As a result, the BIOS may re-enable memory mirroring by copying the contents of the good memory 221 to the newly stored memory 231 via channel 246. Of course, embodiments of the invention work equally well if the erroneous data is located, for example, in a primary data section of memory 221 instead of a redundant memory section of memory 226. In that instance, nonerroneous data from memory 226 may be sparred into memory 231 thereby creating a new mirror relationship between memories 226 and 231. In one embodiment of the invention, the BIOS may also signal that, for example, memory 226 located on a DIMM is faulty and needs to be replaced. The BIOS may signal for this replacement by logging to a management controller.

While the above may concern a memory controller with three channels, various embodiments of the invention may be implemented with systems having, for example only, more than three channels, an odd or even number of channels, channels that are or are not multiples of three, and the like. For example, in a system with five channels, the first channel may couple to a first memory, the second channel may couple to a second memory, the third channel may couple to a third memory, the fourth channel may couple to a fourth memory, and the fifth channel may couple to a fifth memory. The third memory may mirror data in the first memory. The fourth memory may mirror data in the second memory. The fifth memory may be for sparing and may be "hidden" from the operating system (OS) by the BIOS. If an error occurs within data stored in the first memory, redundancy for that data may be lost. In that case, the redundant data in the third memory, which mirrors the erroneous data in the first memory, may be copied to the fifth memory. A "new" mirror may then exist whereby the fifth memory mirrors data in the third memory. The first memory may also be marked for future replacement. Thus, the fifth memory may include error-free data that is redundant to the erroneous data.

Figure 3:
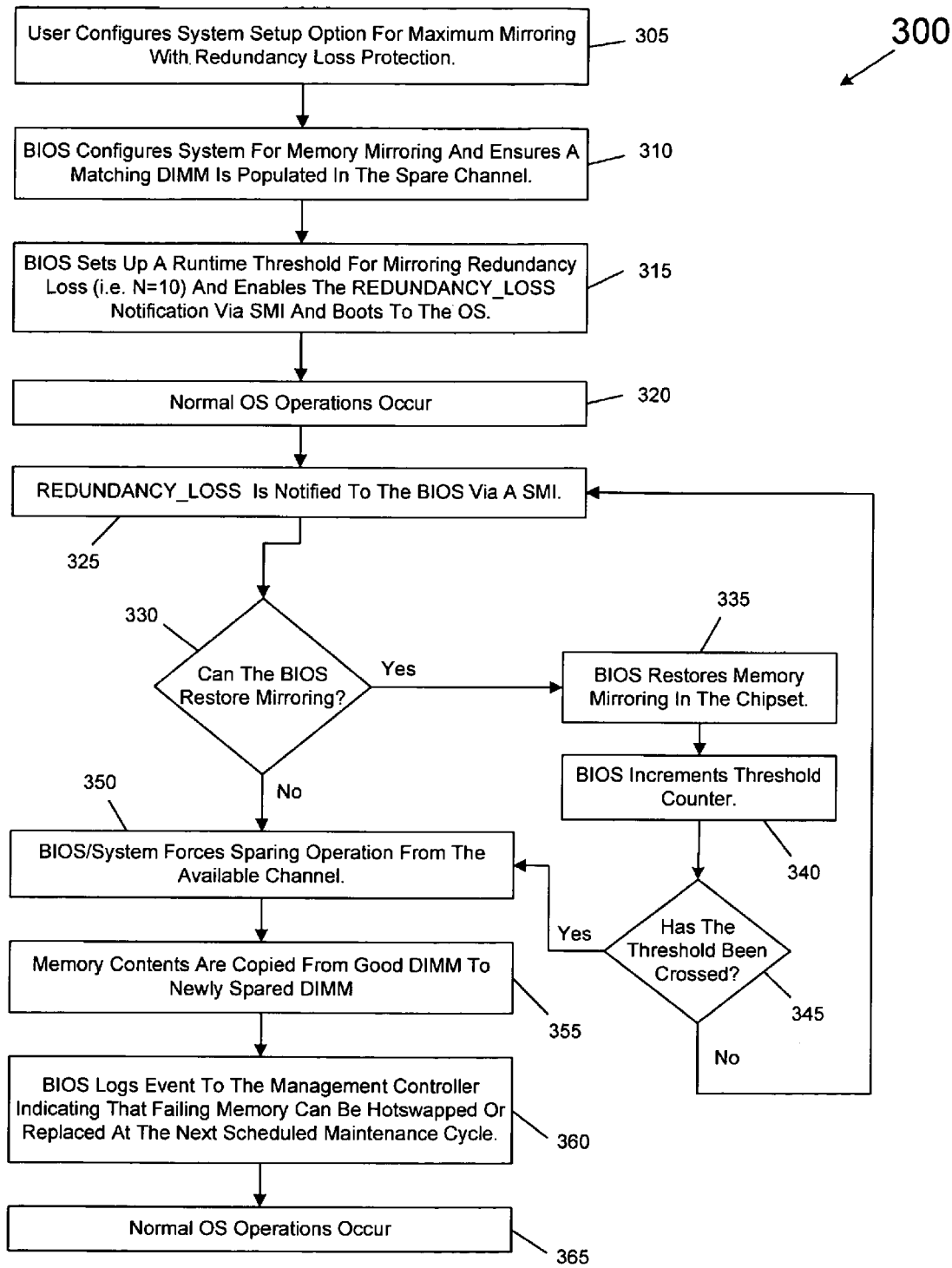
FIG. 3 is a flow diagram in one embodiment of the invention.

FIG. 3 is a flow diagram in one embodiment of the invention. In block 305, a user may configure a system setup option for maximum mirroring with redundancy loss protection. For example, a chipset may issue an interrupt upon an error condition. A single bit error may illicit a first interrupt while a multibit error may illicit a second interrupt. Regardless, the system may be configured such that during a particular error scenario a system management interrupt (SMI) occurs. During the SMI the BIOS may gain full control whereby it performs the aforementioned sparing operation in an OS independent manner. Operations may then resume from the SMI and control may be passed back to the OS from the BIOS in a transparent manner.

In block 310 the BIOS may further configure the system for memory redundancy and ensure that a matching memory (e.g., DIMM) is populated in the spare channel (e.g., spare channel 246 and associated memory 231 of FIG. 2b). In block 315, the BIOS may enable a REDUNDANCY_LOSS bit to be signaled via, for example, SMI when an error (e.g., redundancy loss) occurs. The BIOS may also set up a corresponding memory redundancy error counter and threshold.

In block 320, normal OS operations occur. However, in block 325 the REDUNDANCY_LOSS bit is notified to the BIOS. If the memory redundancy is lost the BIOS will attempt to re-enable the mirroring operation in block 330. After re-enabling mirroring in block 335 using conventional methods that are described below, the BIOS may increment a memory error counter in block 340. In block 345, the system may determine whether the counter exceeds, for example, a predetermined error or fault threshold. If not, the system may return to block 325. If the threshold has been satisfied or if the BIOS could not restore mirroring, the BIOS may proceed to block 350 and force a memory sparing operation on, for example, a faulty DIMM. In block 355, the BIOS may then copy the contents of a good DIMM, which correspond to data in the faulty DIMM, to a newly spared DIMM and re-enable memory mirroring. In block 360, the BIOS may then log the faulty DIMM to the management engine on the system. Normal operation systems operations may resume in block 365.

Thus, one embodiment of the invention includes a memory RAS mode that utilizes both memory mirroring and memory sparing to form more complete memory redundancy loss protection. This may allow systems with, for example only, an unused memory channel or channels to seamlessly support this new RAS mode resulting in a higher level of memory protection.

In one embodiment of the invention, the primary data section resident in, for example, memory 221 (FIG. 2) may be the memory that the memory controller ordinarily reads, with the corresponding redundant data section in memory 226 being a backup. In some embodiments, the memory controller may always read the primary data section rather than the corresponding redundant data section if no failure is detected in the system. However, in other embodiments, the memory controller may choose to read the redundant data section rather than the primary data section even though there is no failure in the system. An example of a reason to do this is it may be quicker to read from the redundant data section.

Some embodiments of the invention may employ primary memory assemblies that store only primary data sections and redundant memory assemblies that store only redundant data sections. However, embodiments of the invention may also use mixed memory assemblies that store both primary and redundant data sections. Under some embodiments of the invention, some of the chips (or a single chip) of a memory module may hold one data section, while other chips (or a chip) may hold another data section. For example, memory chips on one side of a card may store primary data sections (e.g., DA1) in chips while chips on another side of the card hold redundant sections (e.g., DA1').

Furthermore, failure detection circuitry may detect triggering failures in memory assemblies. Failure detection circuitry may also include circuitry to detect when the failure has been corrected. An example of a triggering failure may be when data is lost where the data cannot be recovered without obtaining it from a redundant memory. A correctable failure may be one that can be corrected without copying data from redundant memory. A correctable error may be corrected, for example, through ECC codes. In some embodiments, several correctable errors in the same memory assembly can be interpreted as a triggering error. Ordinarily, correctable failures will not be detected as triggering failures, but in some embodiments, some correctable failures may be treated as triggering failures. Further, in some embodiments, there could be some failures that are not correctable without replacing a memory assembly and copying data from a non-failed memory assembly that will not be treated as triggering failures. Causes of triggering failures may include an original or developed defect in a memory assembly, extreme noise, and some soft errors.

When a triggering failure is detected, for example because an uncorrectable ECC error is encountered, a read may be re-issued to the corresponding memory assembly or assemblies. In one embodiment of the invention, hardware in a memory controller may re-assemble the data in the proper order when reads are issued to the non-failed memory assemblies. Hardware will identify the erroneous data or erroneous memory assembly responsible for the triggering failure, and reconfigure dynamically such that data sections in the victim memory remain or become redundant data sections. If necessary, designation of primary and redundant memory assembly pairs may be swapped such that a preferred read destination does not include the victim.

In various embodiments of the invention, the memory controller may predict the failure of a memory device before such failure actually occurs (e.g., before a redundancy loss occurs). As described above, the operating system, firmware and/or a software run-time application that is interfaced with the memory controller may monitor and/or log memory device errors. Reparable errors may include flipped bits, timed out requests or other functions of the memory device that may be indicative of abnormal operation. Alternatively, the memory controller may interrupt the operating system each time an error occurs. The number of errors necessary to trigger an alert may be a fixed or programmable threshold.

Alternatively or in addition to monitoring errors for evidence of a possible memory device failure, the memory controller, operating system and/or an external application program may monitor the operating temperature of a memory device. If the operating temperature for a memory device exceeds a predetermined threshold, the memory controller may signal to the operating system that a memory device failure may be imminent or in progress. The operating temperature necessary to trigger an alert may be a fixed or programmable threshold value. As such, a threshold temperature that may be indicative of a memory device failure would be known to one skilled in the art of memory device design.

It should be appreciated that there may be numerous other ways in which a memory controller may be able to determine whether a memory device may be failing, therefore, the examples of temperature and error monitoring, while illustrative, should not limit the scope of embodiments of the present invention with regard to memory device failure prediction.

Failure indicating circuitry, referenced above and of potential use in various embodiments of the invention, may provide an indication of certain failures in the memory subsystem. Examples of failure indicating circuitry include circuitry that sends a message to a display indicating the failure of a memory assembly and/or channel. Circuitry that controls a light emitting diode(s) (LED(s)) is another example. Power control circuitry may provide power for the memory modules. In some embodiments, when certain failures of the memory subsystem are detected, the power provided to all or some of the memory assemblies of a channel may be shut down. In other embodiments, as described, when certain failures are detected, a user manually removes power. In other embodiments, software may place some sort of call for service and in response, a person may notify the machine that a hot-swap event is imminent. The software routine may request fail-down to single-channel operation, isolating the channel containing the erroneous memory assembly that has the error. Of course, failure indicating circuitry and power control circuitry are not required. Also, the communication between memory controller and failure indicating circuitry and power control circuitry may be indirect through various intermediate circuits.

Various types of memories may be used in various embodiments of the invention. For example, memory assemblies may include memory modules and discs or portions of disc in hard drive systems, but the inventions are not so limited. Memory modules may each include one or more memory devices. Merely as an example, and not a requirement, memory modules, may be 72-bit Dual In-line Memory Module (DIMMs) for 64 bits for data and 8 bits for ECC. ECC is not required. The memories listed above are not limited to a particular technology. For example, the memories, memory devices, and/or memory units may be Dynamic Random Access Memory (DRAM) chips manufactured according to widely used technology. As another example, the memory devices may be polymer memories. Also, the term "data section" may refer to data that is stored in a particular memory assembly or a portion of the memory assembly at a particular time. The data section may include data that is physically discontinuous in the memory assembly and that is discontinuous in logical memory. Typically, the contents and extent of the data sections change over time. Importantly, the above terms (e.g., memory, memory unit, memory assembly, memory module, and memory device) are intended to be broad, non-restrictive terms that store data/datum.

While the functions herein may be described as being carried out by a particular device, structure, or system, several components, including the memory controller, operating system, BIOS, run-time software, application software, hardware, firmware, or any combination thereof, may be designed to carry out the functions herein without detracting from the scope and spirit of embodiments of the present invention.

Figure 4:
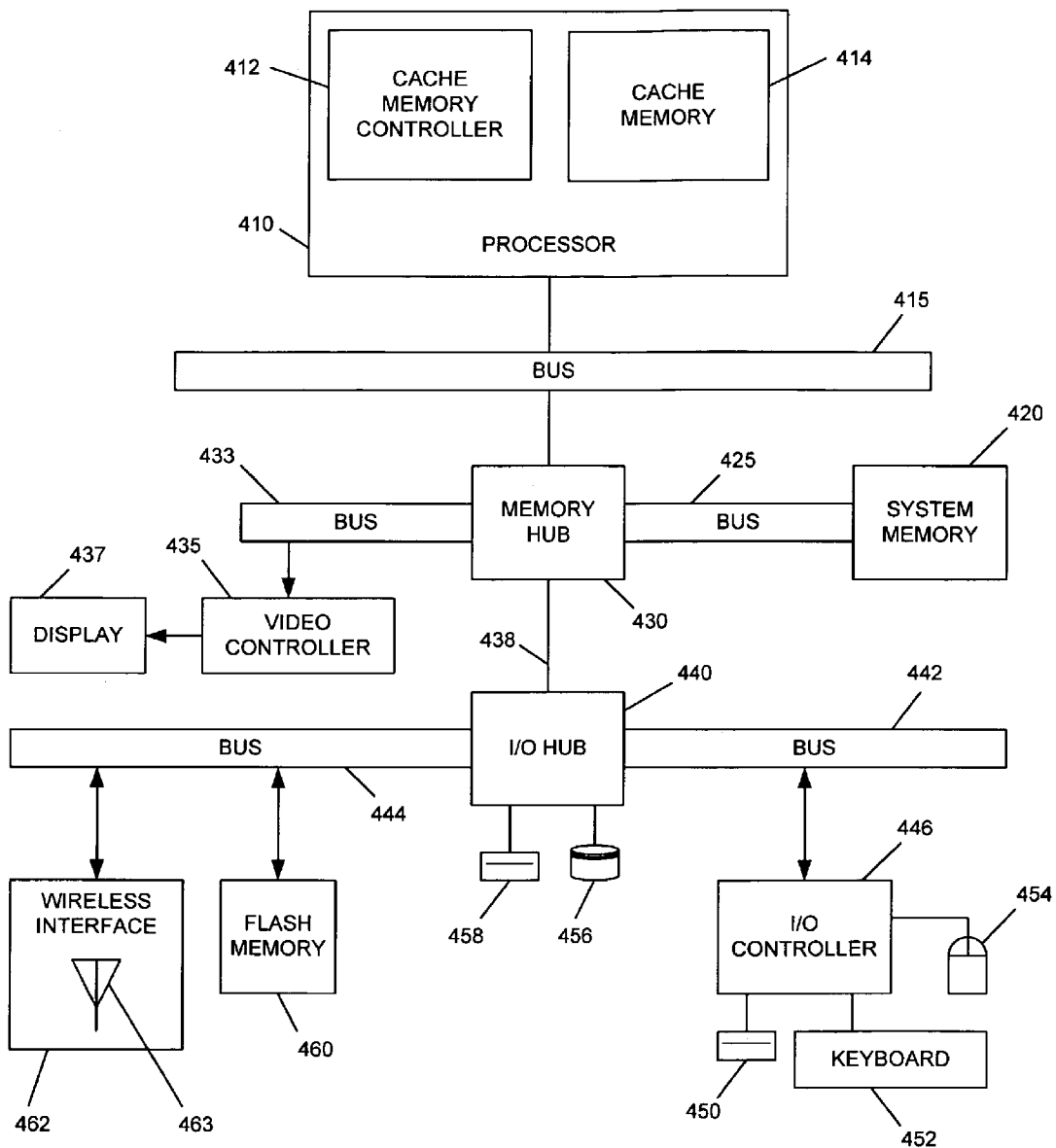
FIG. 4 is a system block diagram for use with one embodiment of the invention.

FIG. 4 is a system block diagram for use with one embodiment of the invention. In one embodiment, computer system 400 includes a processor 410, which may include a general-purpose or special-purpose processor such as a microprocessor, microcontroller, a programmable gate array (PGA), and the like. Processor 410 may include a cache memory controller 412 and a cache memory 414. While shown as a single core, embodiments may include multiple cores and may further be a multiprocessor system including multiple processors 410. Processor 410 may be coupled over a host bus 415 to a memory hub 430 in one embodiment, which may be coupled to a system memory 420 (e.g., a DRAM) via a memory bus 425. Memory hub 430 may also be coupled over an Advanced Graphics Port (AGP) bus 433 to a video controller 435, which may be coupled to a display 437.

Memory hub 430 may also be coupled (via a hub link 438) to an input/output (I/O) hub 440 that is coupled to an input/output (I/O) expansion bus 442 and a Peripheral Component Interconnect (PCI) bus 444, as defined by the PCI Local Bus Specification, Production Version, Revision 2.1 dated June 1995. I/O expansion bus 442 may be coupled to an I/O controller 446 that controls access to one or more I/O devices. These devices may include in one embodiment storage devices, such as a floppy disk drive 450 and input devices, such as a keyboard 452 and a mouse 454. I/O hub 440 may also be coupled to, for example, a hard disk drive 458 and a compact disc (CD) drive 456. It is to be understood that other storage media may also be included in the system.

PCI bus 444 may also be coupled to various components including, for example, a flash memory 460. A wireless interface 462 may be coupled to PCI bus 444, which may be used in certain embodiments to communicate wirelessly with remote devices. Wireless interface 462 may include a dipole or other antenna 463 (along with other components not shown). While such a wireless interface may vary in different embodiments, in certain embodiments the interface may be used to communicate via data packets with a wireless wide area network (WWAN), a wireless local area network (WLAN), a BLUETOOTH™, ultrawideband, a wireless personal area network (WPAN), or another wireless protocol. In various embodiments, wireless interface 462 may be coupled to system 400, which may be a notebook or other personal computer, a cellular phone, personal digital assistant (PDA) or the like, via an external add-in card or an embedded device. In other embodiments wireless interface 462 may be fully integrated into a chipset of system 400. In one embodiment of the invention, a network controller (not shown) may be coupled to a network port (not shown) and the PCI bus 444. Additional devices may be coupled to the I/O expansion bus 442 and the PCI bus 444. Although the description makes reference to specific components of system 400, it is contemplated that numerous modifications and variations of the described and illustrated embodiments may be possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   storing (a) primary data in a first memory that is coupled to a memory controller via a first channel, and (b) first redundant data in a second memory that is coupled to the memory controller via a second channel, wherein (c) the first redundant data is redundant to the primary data and, (d) one of the first memory and the second memory includes erroneous data that corresponds to one of the primary data and the first redundant data; and
   storing second redundant data in a third memory based on the erroneous data, the third memory being coupled to the memory controller via a third channel and the second redundant data being redundant to one of the primary data and the first redundant data.

2. The method of claim 1, further comprising storing the primary data in a first Dual In-line Memory Module (DIMM) that includes the first memory and storing the first redundant data in a second DIMM that includes the second memory.

3. The method of claim 1, further comprising storing the second redundant data in the third memory based on detecting a predetermined number of errors for one of the first memory and the second memory.

4. The method of claim 1, further comprising storing the second redundant data in the third memory based on detecting the erroneous data.

5. The method of claim 1, further comprising storing the second redundant data in the third memory based on a sparing operation and storing the first redundant data in the second memory based on a memory mirroring operation.

6. The method of claim 2, further comprising designating one of the first memory and second memory for replacement based on the erroneous data.

7. The method of claim 1, further comprising storing the second redundant data in the third memory after a redundancy loss occurs between the primary data and the first redundant data and attempting to restore memory mirroring between the primary data and the first redundant data.

8. An article comprising a medium storing instructions that enable a processor-based system to:
   store primary data in a first memory to be coupled to a first channel and a memory controller;
   store first redundant data in a second memory to be coupled to a second channel and the memory controller, the first redundant data to be redundant to the primary data; and
   store second redundant data in a third memory based on a redundancy loss between the primary data and the first redundant data, the third memory to be coupled to a third channel and the memory controller and the second redundant data to be redundant to one of the primary data and the first redundant data.

9. The article of claim 8, further storing instructions that enable the processor based-system to store the second redundant data in the third memory after the redundancy loss occurs.

10. The article of claim 8, further storing instructions that enable the processor based-system to store the second redundant data in the third memory based on detecting a predetermined number of redundancy losses.

11. The article of claim 8, further storing instructions that enable the processor based-system to store the second redundant data in the third memory based on a sparing operation and store the first redundant data in the second memory based on a memory mirroring operation.

12. The article of claim 11, further storing instructions that enable the processor based-system to store the second redundant data in the third memory based on the redundancy loss, wherein the redundancy loss is a predicted redundancy loss.

13. The article of claim 9, further storing instructions that enable the processor based-system to designate one of the first memory and second memory for replacement based on the redundancy loss.

14. The article of claim 8, further storing instructions that enable the processor based-system to store the second redundant data in the third memory after attempting to restore memory mirroring between the primary data and the first redundant data that was lost in response to the redundancy loss previously occurring.

15. The article of claim 8, further storing instructions that enable the processor based-system to store the primary data in a first DIMM that includes the first memory and store the first redundant data in a second DIMM that includes the second memory.

16. The method of claim 5, wherein storing the second redundant data in the third memory based on the sparing operation includes copying the second redundant data into the third memory.

17. The method of claim 5, wherein storing the first redundant data in the second memory based on the memory mirroring operation includes maintaining a copy of the primary data in the second memory.

18. The method of claim 1, wherein storing the second redundant data in the third memory includes copying data from one of the first memory and the second memory that does not include the erroneous data to the third memory.

19. The method of claim 18 including taking the one of the first memory and the second memory that includes the erroneous data off line both (a) after storing the second redundant data in the third memory and (b) based on storing the second redundant data in the third memory.

20. The method of claim 19 including, in a manner transparent to an operating system (OS) that is coupled to the first, second, and third memories, using a basic input/output system (BIOS) to both (a) take the one of the first memory and the second memory that includes the erroneous data off line, and (b) copy the data from the one of the first memory and the second memory that does not include the erroneous data to the third memory.

* * * * *